United States Patent [19]

Akasaki et al.

[11] Patent Number: 4,912,184

[45] Date of Patent: Mar. 27, 1990

[54] PROCESS FOR PRODUCING MONODISPERSE VINYL POLYMER FINE PARTICLES

[75] Inventors: Yutaka Akasaki; Naoya Yabuuchi; Tatsuro Ohki, all of Kanagawa, Japan

[73] Assignee: Fuji Xerox Co., Ltd., Tokyo, Japan

[21] Appl. No.: 152,002

[22] Filed: Feb. 3, 1988

[30] Foreign Application Priority Data

Feb. 4, 1987 [JP] Japan ............................... 62-022531
Feb. 4, 1987 [JP] Japan ............................... 62-022534

[51] Int. Cl.$^4$ ............................................. C08F 2/08
[52] U.S. Cl. .................................... 526/202; 526/328; 526/329.2; 526/346; 526/347; 526/909; 525/59; 525/243; 525/330.4; 525/330.6
[58] Field of Search ............... 526/202, 328, 346, 909, 526/329.2, 347; 525/59, 243, 330.4, 330.6

[56] References Cited

U.S. PATENT DOCUMENTS

| | | | |
|---|---|---|---|
| 2,980,655 | 4/1961 | Glass et al. | 526/328.5 X |
| 3,919,140 | 11/1975 | Hirata et al. | 526/202 X |
| 4,208,499 | 6/1980 | Maruhashi et al. | 526/202 |

FOREIGN PATENT DOCUMENTS 49-30690  8/1974  Japan ................................... 526/202

OTHER PUBLICATIONS

Noro, Hydrolysis of Polyvinyl Acetate to Polyvinyl Alcohol, in Polyvinyl Alcohol, Finch (ed.) J. Wiley and Sons, N.Y., 94, 109 (1973).

Primary Examiner—Joseph L. Schofer
Assistant Examiner—F. M. Teskin
Attorney, Agent, or Firm—Finnegan, Henderson, Farabow, Garrett and Dunner

[57] ABSTRACT

A process for producing monodisperse vinyl polymer fine particles is disclosed, which comprises polymerizing at least one monomer selected from the group consisting of vinyl aromatic compounds, acrylic esters, and methacrylic esters as dissolved in an organic solvent or a mixed solvent of water and an organic solvent, which is capable of dissolving said monomer or monomers but incapable of dissolving a produced polymer, wherein said polymerizing is carried out in the presence of partially saponified polyvinyl alcohol having a degree of saponification of from 5 to 75 mol % and a number average degree of polymerization of from 100 to 3,000 as a dispersion stabilizer and in the presence of a polymerization initiator. Monodisperse polymer particles having a particle size of the order of micron with a narrow size distribution can be obtained through the one-step polymerization.

7 Claims, No Drawings

PROCESS FOR PRODUCING MONODISPERSE VINYL POLYMER FINE PARTICLES

FIELD OF THE INVENTION

This invention relates to a process for producing monodisperse vinyl polymer fine particles having a number average particle size of from 1.0 to 20.0 μm by dispersion polymerization of a vinyl monomer(s) in an organic solvent or a mixed solvent of an organic solvent and water.

BACKGROUND OF THE INVENTION

Polymer latices comprising particles of micron size are typically prepared by suspension polymerization, in which an oil-soluble polymerization initiator is dissolved in a vinyl monomer and the mixture is poured into water in the presence of a protective colloid to effect polymerization in a suspended state. This technique, however, encounters with great difficulty in control of dispersed particles so as to have a narrow size distribution.

In order to overcome this disadvantage, it has been proposed to obtain a monodisperse polymer by seed polymerization as described in Japanese Patent Application (OPI) No. 106554/83 (the term "OPI" as used herein refers to a "published unexamined Japanese patent application"). According to this process, fine polymer particles having a size of about 0.5 μm are once produced by emulsion polymerization, which are then allowed to grow through further polymerization On the other hand, it is known that monodisperse polymer particles of micron size can be obtained through one-step polymerization by solution polymerization in a heterogeneous system (hereinafter referred to as "solution system dispersion polymerization"), as taught in J. Polym. Sci. Polym. Lett. (ed.), Vol. 23, 103–108 (1985), in which a monomer is polymerized as dissolved in a solution capable of dissolving the monomer but incapable of dissolving a produced polymer.

The aforesaid seed polymerization involves a larger number of stages for growth of polymer particles according as the desired particle size becomes greater, which is disadvantageous from economical standpoints. The solution system dispersion polymerization has an advantage in that fine polymer particles having a uniform size of about 10 μm at the greatest can be obtained, but the particle size as well as its distribution varies to a great extent depending on the polymerization conditions, such as a temperature and an amount of a polymerization initiator used.

SUMMARY OF THE INVENTION

An object of this invention is to provide a process for producing fine polymer particles of micron size through on-step polymerization.

Another object of this invention is to provide a technique for solution system dispersion polymerization with minimized variation in particle size distribution depending on the polymerization conditions, and particularly a polymerization temperature and an amount of a polymerization initiator.

The inventors have conducted extensive studies on achievement of uniformity of fine polymer particles in size, noting that a protective colloid to be used in solution system dispersion polymerization has a considerable significance as a dispersion stabilizer. As a result, it has now been found that the above objects of the present invention can be accomplished by using polyvinyl alcohol having a relatively low degree of saponification as a dispersion stabilizer. The present invention has been completed based on this finding.

The present invention relates to a process for producing monodisperse vinyl polymer fine particles by polymerizing at least one monomer selected from the group consisting of vinyl aromatic compounds, acrylic esters, and methacrylic esters as dissolved in an organic solvent or a mixed solvent of water and an organic solvent, which is capable of dissolving said monomer or monomers but incapable of dissolving a produced polymer, wherein said polymerizing is carried out in the presence of partially saponified polyvinyl alcohol having a degree of saponification of from 5 to 75 mol% and a number average degree of polymerization of from 100 to 3,000, and preferably having a mercapto group at the terminal thereof, as a dispersion stabilizer and in the presence of a polymerization initiator.

DETAILED DESCRIPTION OF THE INVENTION

The monomer or monomers to be polymerized according to the process of the present invention is or are selected from the group consisting of vinyl aromatic compounds, e.g., styrene, etc., acrylic esters, and methacrylic esters. Examples of the monomer include styrene and its derivatives such as o-methylstyrene, m-methylstyrene, p-methylstyrene, p-ethylstyrene, 2,4-dimethylstyrene, p-n-butylstyrene, p-tert-butylstyrene, p-n-hexylstyrene, p-n-octylstyrene, p-n-nonylstyrene, p-n-decylstyrene, p-n-dodecylstyrene, p-methoxystyrene, p-phenylstyrene, p-chlorostyrene, and 3,4-dichlorostyrene; and acrylic or methacrylic esters such as methyl acrylate, ethyl acrylate, n-butyl acrylate, isobutyl acrylate, propyl acrylate, n-octyl acrylate, dodecyl acrylate, 2-ethylhexyl acrylate, stearyl acrylate, 2-chloroethyl acrylate, phenyl acrylate, methyl α-chloroacrylate, methyl methacrylate, ethyl methacrylate, propyl methacrylate, n-butyl methacrylate, isobutyl methacrylate, n-octyl methacrylate, dodecyl methacrylate, 2-ethylhexyl methacrylate, stearyl methacrylate, phenyl methacrylate, dimethylaminoethyl methacrylate, and diethylaminoethyl methacrylate.

In carrying out the polymerization, these monomers are dissolved in an organic solvent or a mixed solvent of an organic solvent and water, and, as a protective colloid, partially saponified polyvinyl alcohol having a degree of saponification of from 5 to 75 mol%, preferably from 10 to 55 mol% and a number average degree of polymerization of from 100 to 3,000, preferably from 100 to 2,000, is added to the polymerization system. The partially saponified polyvinyl alcohol may contain a carboxyl group or a sulfo group, or an alkali metal (e.g., Na, K, etc.) or ammonium salt thereof. A mercapto group may also be contained in the polyvinyl alcohol. The partially saponified polyvinyl alcohol of the present invention can be prepared by a conventional manner, for example, by hydrolyzing a polymer of vinyl ester such as vinyl acetate.

The degree of saponification of the polyvinyl alcohol can be calculated from the following equation $$\text{Degree of Saponification} = \frac{m}{m + l} \times 100 \, (\%)$$

wherein m and l are the numbers (moles) of hydroxyl group and carbonyloxy group contained in the polyvinyl alcohol. If the degree of saponification or degree of polymerization of the partially saponified polyvinyl alcohol is out of the above-recited range, the size distribution of the resulting polymer particles is broad, failing to obtain desired monodisperse polymer particles.

The partially saponified polyvinyl alcohol is used in an amount of from 1.0 to 25.0 parts by weight, preferably from 5.0 to 15.0 parts by weight, per 100 parts by weight of a monomer or a monomer mixture.

In the present invention, it is particularly preferable to use, as a dispersion stabilizer, mercapto-terminated partially saponified polyvinyl alcohol having a degree of saponification of from 5 to 75 mol and a number average degree of polymerization of from 100 to 2,000 from the reason set forth below.

In the solution system dispersion polymerization, it is known that a graft polymer is formed in the initial stage o polymerization by the action of a high polymeric free radical dissolved in the system as a dispersion stabilizer. It is believed that the graft polymer thus formed would function as an aid for emulsion formation whereby dispersion polymerization stably proceeds to produce polymer particles having a relatively narrow size distribution. Similarly, in the present invention, the mercapto group at the terminal of the partially saponified polyvinyl alcohol is assumed to readily receive an attack of a free radical to become a free radical by itself to form a graft polymer. As a result an interfacial tension between dispersed particles and the dispersion medium is reduced to thereby produce polymer particles having a narrow size distribution.

The organic solvent or water/organic solvent mixture is not particularly limited as long as it is capable of dissolving the vinyl monomers but incapable of dissolving the polymer produced. Specific examples of solvents which can be used preferably include alcohols, e.g., methanol, ethanol, propanol, butanol, etc., ether alcohols, e.g., ethylene glycol monomethyl ether, ethylene glycol monoethyl ether, etc.; ethers, e.g., tetrahydrofuran, dimethoxyethane, etc.; mixtures thereof; and mixtures of these organic solvents and water. The solvent, may contain up to 80% by weight, preferably up to 60% by weight, of water. The weight ratio of he solvent to monomer(s) generally ranges from 65/35 to 95/5, and preferably from 80/20 to 90/10.

The polymerization initiator to be used in this invention is not particularly restricted as long as it is soluble in the polymerization solvent used. Examples of usable initiators include benzyl peroxide, lauroyl peroxide, azobisisobutylonitrile, azobisvaleronitrile, and the like. The amount of the initiator to be used ranges from 0.1 to 10.0 parts by weight, preferably from 0.5 to 5.0 parts by weight, per 100 parts by weight of the vinyl monomer(s).

In the present invention, the polymerization reaction proceeds in a monomer solution, and the produced polymer is precipitated in the form of monodisperse fine particles. The reaction temperature is appropriately set so as to obtain a polymer of a desired particle size usually ranging from 40° to 90° C. and preferably from 45° to 75° C.

The use of the partially saponified polyvinyl alcohol according to the present invention makes it possible to produce monodisperse fine polymer particles having a particle size of the order of micron with a narrow size distribution.

The present invention is now illustrated in greater detail with reference to Examples and Comparative Examples, but it should be understood that the present invention is not deemed to be limited thereto. In these examples, the standard deviation of the particle size distribution curve was measured by the use of a Coulter counter.

EXAMPLE 1

In 500 ml-glass separable flask equipped with tilted paddles, a temperature controller, an inlet for introducing nitrogen, an inlet for feeding monomers and a refluxing tube were charged 170 g of methyl cellosolve and 170 g of ethanol as solvents, an 6.0 g of partially saponified polyvinyl alcohol having a degree of saponification of 24 mol% and a number average degree of polymerization of 1700 was dissolved therein. The temperature was elevated up to 65° C., and, after confirming that the temperature of the mixture became constant, a mixture of 60 g of styrene and 2.4 g of benzoyl peroxide as a polymerization initiator was added thereto to effect polymerization for 40 hours.

The resulting polymer late was found to have a number average particle size of 8.2 $\mu$m with a standard deviation of the particle size distribution of 1.18. The polymer had a weight average molecular weight of 32,600, a number average molecular weight of 9,800, and a glass transition point of 99° C.

EXAMPLE 2

In the same glass-made separable flask as used in Example 1 were charged 312 g of ethanol and 38 g of water as solvents, and 6.0 g of partially saponified polyvinyl alcohol having a degree of saponification of 62 mol% and a number average degree of polymerization of 1,700 was dissolved therein. The temperature was elevated to 65° C. and, after the temperature of the mixture became constant, a mixture of 36 g of styrene, 24 g of n-butyl methacrylate, and 2.4 g of benzoyl peroxide as a polymerization initiator was added thereto to effect polymerization for 40 hours.

The resulting polymer latex was found to have a number average particle size of 7.6 $\mu$m and a standard deviation of the particle size distribution of 1.17. The polymer had a weight average molecular weight of 31,400, a number average molecular weight of 10,100, and a glass transition point of 58° C.

COMPARATIVE EXAMPLE 1

The procedure of Example 1 was repeated, except that the partially saponified polyvinyl alcohol was replaced with hydroxypropyl cellulose (HPC-L, produced by Nisso Co., Ltd.).

The resulting polymer latex was found to have a number average particle size of 7.7 $\mu$m and a standard deviation of the particle size distribution of 1.26. The polymer had a weight average molecular weight of 30,600, a number average molecular weight of 10,100, and a glass transition point of 99° C.

COMPARATIVE EXAMPLE 2

The procedure of Example 1 was repeated, except that the partially saponified polyvinyl alcohol was replaced with polyacrylic acid (produced by Scientific Polymer Products Co.; m.w. 25,000).

The resulting polymer latex was found to have a number average particle size of 7.5 $\mu$m and a standard deviation of the particle size distribution of 1.28. The polymer had a weight average molecular weight of 31,000, a number average molecular weight of 9,800, and a glass transition point of 99° C.

EXAMPLE 3

In the same glass-made separable flask as used in Example 1 were charged 330 g of methyl cellosolve and 10 g of water as solvents, and 6.0 g of partially saponified polyvinyl alcohol having a degree of saponification of 21 mol% and a number average degree of polymerization of 1,700 was dissovled therein. The temperature was elevated up to 65° C., and, after the temperature of the mixture was confirmed to become constant, a mixture of 60 g of styrene and a varied amount of benzoyl peroxide as a polymerization initiator as shown in Table 1 was added thereto to effect polymerization for 40 hours.

Each of the resulting polymer latices was determined for number average particle size and standard deviation of the particle size distribution, and the results obtained are shown in Table 1 below.

TABLE 1

| Sample No. | Amount of Polymerization Initiator (g) | Average Particle Size (μm) | Standard Deviation |
|---|---|---|---|
| 1 | 2.0 | 8.0 | 1.16 |
| 2 | 2.4 | 9.6 | 1.14 |
| 3 | 2.7 | 9.5 | 1.12 |
| 4 | 3.2 | 12.0 | 1.14 |

COMPARATIVE EXAMPLE 3

The procedure of Example 3 was repeated, except that the partially saponified polyvinyl alcohol was replaced with hydroxypropyl cellulose (HPC-L) and the amount of the polymerization initiator was varied as shown in Table 2. Each of the resulting polymer latices was determined for number average particle size an standard deviation of the particle size distribution, and the results obtained are shown in Table 2.

TABLE 2

| Sample No. | Amount of Polymerization Initiator (g) | Average Particle Size (μm) | Standard Deviation |
|---|---|---|---|
| 5 | 2.0 | 6.5 | 1.32 |
| 6 | 2.4 | 8.0 | 1.24 |
| 7 | 2.7 | 10.0 | 1.30 |
| 8 | 3.2 | 15.0 | 1.37 |

Making a comparison between Example 3 and Comparative Example 3, it can be seen that the polymer particles produced by the process of the present invention are less liable to variation in particle size distribution with change in polymerization condition.

EXAMPLE 4

In the same glass-made separable flask as used in Example 1 were charged 330 g of methyl cellosolve and 10 g of water as solvents, and 6.0 g of mercapto-terminated partially saponified polyvinyl alcohol having a degree of saponification of 23 mol% and a number average degree of polymerization of 200 was dissolved therein. The temperature was elevated to 65° C., and, after confirming that the temperature of the mixture became constant, a mixture of 60 g of styrene and 2.4 g of benzoyl peroxide as a polymerization initiator was added to the mixture to effect polymerization for 40 hours.

The resulting polymer latex was found to have a number average particle size of 4.0 μm and a standard deviation of the particle size distribution of 1.14. The polymer had a weight average molecular weight of 36,200 and a number average molecular weight of 11,400.

EXAMPLE 5

The procedure of Example 4 was repeated, except that the partially saponified polyvinyl alcohol as used in Example 4 was replaced with mercapto-terminated partially saponified polyvinyl alcohol having a degree of saponification of 24 mol% and a number average degree of polymerization of 700.

The resulting polymer latex was found to have a number average particle size of 6.5 μm and a standard deviation of the particle size distribution of 1.11. The polymer had a weight average molecular weight of 33,400 and a number average molecular weight of 10,400.

EXAMPLE 6

The procedure of Example 4 was repeated, except that the partially saponified polyvinyl alcohol as used in Example 4 was replaced with mercapto-terminated partially saponified polyvinyl alcohol having a degree of saponification of 24 mol% and a number average degree of polymerization of 1400.

The resulting polymer latex was found to have a number average particle size of 7.8 μm and a standard deviation of the particle size distribution of 1.10. The polymer had a weight average molecular weight of 31,000 and a number average molecular weight of 10,400.

EXAMPLE 7

The procedure of Example 4 was repeated, except for replacing the partially saponified polyvinyl alcohol as used in Example 4 with mercapto-terminated partially saponified polyvinyl alcohol having a degree of saponification of 70 mol% and a number average degree of polymerization of 200.

The resulting polymer latex was found to have a number average particle size of 3.2 μm and a standard deviation of the particle size distribution of 1.15. The polymer had a weight average molecular weight of 34,600 and a number average molecular weight of 11,000.

EXAMPLE 8

In the same glass-made separable flask as used in Example 1 were charged 312 g of ethanol and 38 g of water as solvents, and 6.0 g of mercapto-terminated partially saponified polyvinyl alcohol having a degree of saponification of 24 mol% and a number average degree of polymerization of 700 was dissolved therein. The temperature was elevated up to 65° C., and, after confirming that the temperature of the mixture became constant, a mixture of 36 g of styrene, 24 g of n-butyl methacrylate, and 2.4 g of benzoyl peroxide as a polymerization initiator was added thereto to effect polymerization for 40 hours.

The resulting polymer latex was found to have a number average particle size of 7.4 μm and a standard deviation of the particle size distribution of 1.12. The polymer had a weight average molecular weight of 35,700 and a number average molecular weight of 12,100.

COMPARATIVE EXAMPLE 4

The procedure of Example 4 was repeated, except for replacing the partially saponified polyvinyl alcohol as used in Example 4 with polyacrylic acid (m.w. 25,000).

The resulting polymer latex was found to have a number average particle size of 8.9 μm and a standard deviation of the particle size distribution of 1.31.

EXAMPLE 9

The procedure of Example 4 was repeated, except for replacing the partially saponified polyvinyl alcohol as used in Example 4 with mercapto-terminated partially saponified polyvinyl alcohol having a degree of saponification of 24 mol% and a number average degree of polymerization of 1,000 and varying the amount of the polymerization initiator as shown in Table 3 below.

Each of the resulting polymer latices was determined for number average particle size and standard deviation of the particle size distribution, and the results obtained are shown in Table 3.

TABLE 3

| Sample No. | Amount of Polymerization Initiator (g) | Average Particle Size (μm) | Standard Deviation |
|---|---|---|---|
| 9 | 2.0 | 7.8 | 1.10 |
| 10 | 2.4 | 9.0 | 1.08 |
| 11 | 2.7 | 9.6 | 1.08 |
| 12 | 3.2 | 10.8 | 1.11 |

Making a comparison between Example 9 and Comparative Example 3, it is apparent that the polymer particles obtained by the process of the present invention are less liable to variation in particle size distribution with change of polymerization condition.

Further, when the results of Table 3 are compared with those of Table 1, it can be seen that the mercapto-terminated partially saponified polyvinyl alcohol is particularly preferred in the present invention.

As described above, dispersion polymerization of vinyl monomers stably proceeds in a solvent in the presence of partially saponified polyvinyl alcohol, and preferably mercapto-terminated partially saponified polyvinyl alcohol, which has a degree of saponification of from 5 to 75 mol% and a number average degree of polymerization of from 100 to 3,000. As a result, monodisperse fine polymer particles having a particle size of 1.0 μm or more with a narrow side distribution can be obtained easily through one polymerization step. In addition, the particle size distribution of the resulting polymer particles are less liable to variation with changes of polymerization conditions, such as the amount of a polymerization initiator used.

The monodisperse fine polymer particles produced by the present invention can be used in various applications, such as electrophotographic developers, spacers for liquid crystal display elements, carriers for immunological diagnostic agents, fillers for columns, coatings, and the like. In particular, colored fine polymer particles are advantageous since they are applied as such as an electrophotographic developer.

While the invention has been described in detail and with reference to specific embodiments thereof, it will be apparent to one skilled in the art that the various changes and modifications can be made therein without departing from the spirit and scope thereof.

What is claimed is:

1. A process for producing monodisperse vinyl polymer fine particles by polymerizing at least one monomer selected from the group consisting of vinyl aromatic compounds, acrylic esters, and methacrylic esters dissolved in an organic solvent or a mixed solvent of water and an organic solvent, which solvent is capable of dissolving said monomer or monomers but incapable of dissolving a produced polymer, wherein said polymerizing is carried out in the presence of partially saponified polyvinyl alcohol having a degree of saponification of from 10 to 55 mol% and a number average degree of polymerization of from 100 to 3,000 as a dispersion stabilizer and in the presence of a polymerization initiator.

2. A process as claimed in claim 1, wherein said partially saponified polyvinyl alcohol is present in an amount of from 1.0 to 25.0 parts by weight per 100 parts by weight of the monomer or monomers.

3. A process as claimed in claim 1, wherein said partially saponified polyvinyl alcohol is present in an amount of from 5.0 to 15.0 pars by weight per 100 parts by weight of the monomer or monomers.

4. A process as claimed in claim 1, wherein the weight ratio of said organic solvent or mixed solvent to the monomer or monomers ranges from 65/35 to 95/5.

5. A process as claimed in claim 1, wherein the weight ratio of said organic solvent or mixed solvent to monomer ranges from 80/20 to 90/10.

6. A process for producing monodisperse vinyl polymer fine particles by polymerizing at least one monomer selected from the group consisting of vinyl aromatic compounds, acrylic esters, and methacrylic esters dissolved in an organic solvent or a mixed solvent of water and an organic solvent which solvent is capable of dissolving said monomer or monomers but incapable of dissolving a produced polymer, wherein said polymerizing is carried out in the presence of partially saponified polyvinyl alcohol having a mercapto group at the terminal thereof, a degree of saponification of from 5 to 75 mol% and a number average degree of polymerization of from 100 to 3,000 as a dispersion stabilizer and in the presence of a polymerization initiator.

7. A process as claimed in claim 6, wherein said mercapto-terminated partially saponified polyvinyl alcohol has a number average degree of polymerization of from 100 to 2,000.

* * * * *

UNITED STATES PATENT AND TRADEMARK OFFICE
CERTIFICATE OF CORRECTION

PATENT NO.   : 4,912,184

DATED        : March 27, 1990

INVENTOR(S)  : Yutaka AKASAKI, Naoya YABUUCHI, Tatsuro OHKI

It is certified that error appears in the above-identified patent and that said Letters Patent is hereby corrected as shown below:

Claim 3, column 8, line 33, change "pars" to --parts--.

Signed and Sealed this

Sixteenth Day of July, 1991

*Attest:*

HARRY F. MANBECK, JR.

*Attesting Officer*  *Commissioner of Patents and Trademarks*